United States Patent [19]

Hijikata et al.

[11] Patent Number: 5,398,541

[45] Date of Patent: Mar. 21, 1995

[54] PROCESS AND AN APPARATUS FOR DETERMINING PRESSURE LOSSES OF EXHAUST GAS PURIFICATION HONEYCOMB STRUCTURAL BODIES, BY PRESUMPTION, AT RESPECTIVE POINTS OF TIME WHEN HONEYCOMB STRUCTURAL BODIES ARE TO BE REGENERATED

[75] Inventors: Toshihiko Hijikata; Satoru Yamada, both of Nagoya, Japan

[73] Assignee: NGK Insulators, Ltd., Japan

[21] Appl. No.: 33,555

[22] Filed: Mar. 18, 1993

[30] Foreign Application Priority Data

Mar. 23, 1992 [JP] Japan .................................. 4-065252

[51] Int. Cl.$^6$ .............................................. G01N 15/08
[52] U.S. Cl. ............................................................ 73/38
[58] Field of Search ....................... 55/270, 274; 73/38

[56] References Cited

U.S. PATENT DOCUMENTS

| | | | |
|---|---|---|---|
| 3,325,010 | 6/1967 | Sackett | 73/38 |
| 3,608,354 | 9/1971 | Taylor et al. | 73/38 |
| 4,462,208 | 7/1984 | Hicks et al. | 73/38 |
| 4,492,079 | 1/1985 | Takagi et al. | 73/38 |
| 5,036,698 | 8/1991 | Conti | 73/38 |
| 5,102,434 | 4/1992 | Hijikata et al. | 73/38 |
| 5,150,604 | 9/1992 | Succi et al. | 73/38 |

*Primary Examiner*—Hezron E. Williams
*Assistant Examiner*—Michael J. Brock
*Attorney, Agent, or Firm*—Parkhurst, Wendel & Rossi

[57] ABSTRACT

A process is disclosed for determining a pressure loss of exhaust gas purification honeycomb structural bodies to be inspected, at a point of time when the honeycomb structural body is to be regenerated, said honeycomb structural body having a number of through holes alternatively sealed at opposite end faces, comprising the steps of: (1) flowing particles through each of exhaust gas purification honeycomb structural bodies of a given type in an axial direction of the through holes thereof, (2) determining a relationship between the pressure loss of the exhaust gas purification honeycomb structural body at a point of time when the honeycomb structural body catches a given amount of the particles and the pressure loss of the honeycomb structural body at a point of time when the honeycomb structural body catches the particles in such an amount suitable for the regeneration, (3) then measuring the pressure loss of a honeycomb structural body to be inspected, at a point of time when the honeycomb structural body to be inspected catches said given amount of the particles, and (4) based on the thus measured pressure loss, presuming the pressure loss at a point of time suitable for the regeneration thereof with reference to the relationship determined above. An apparatus is also disclosed to effect the above process.

3 Claims, 3 Drawing Sheets

FIG_2
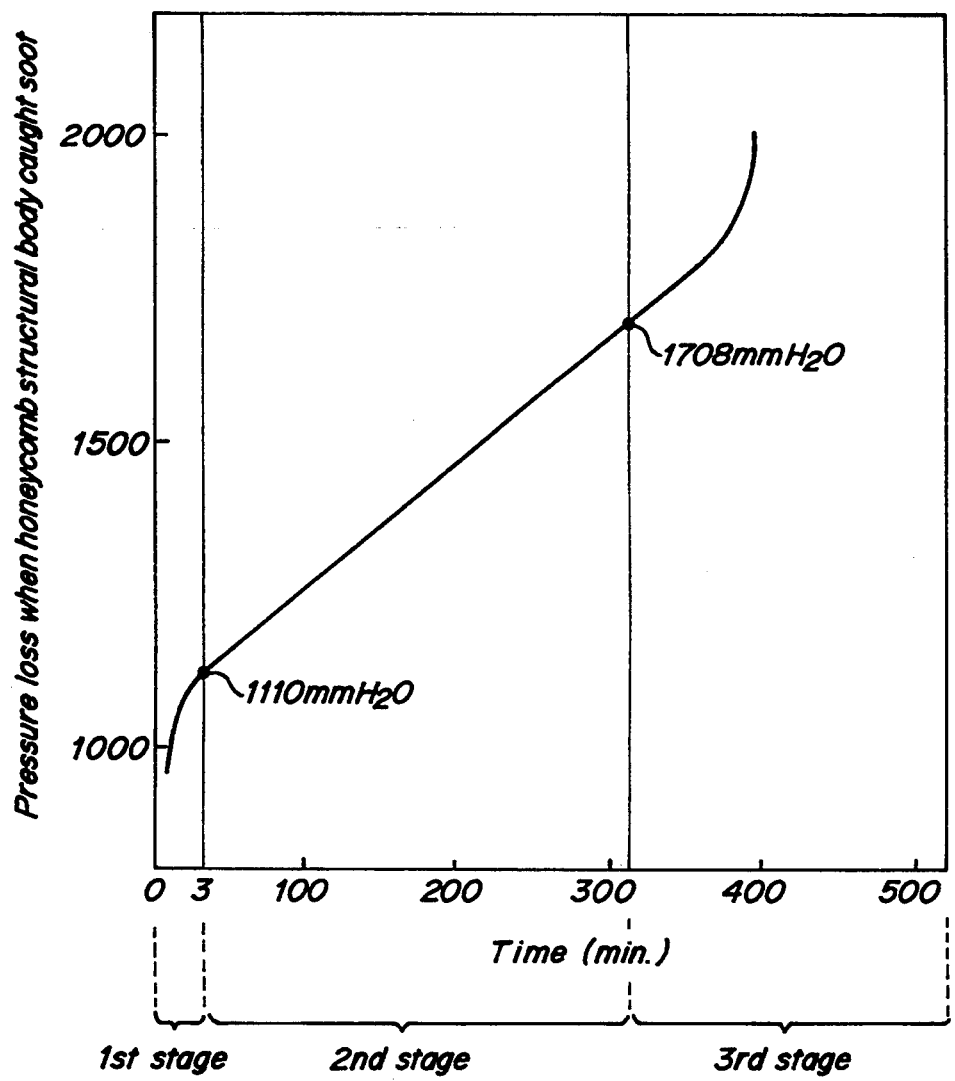

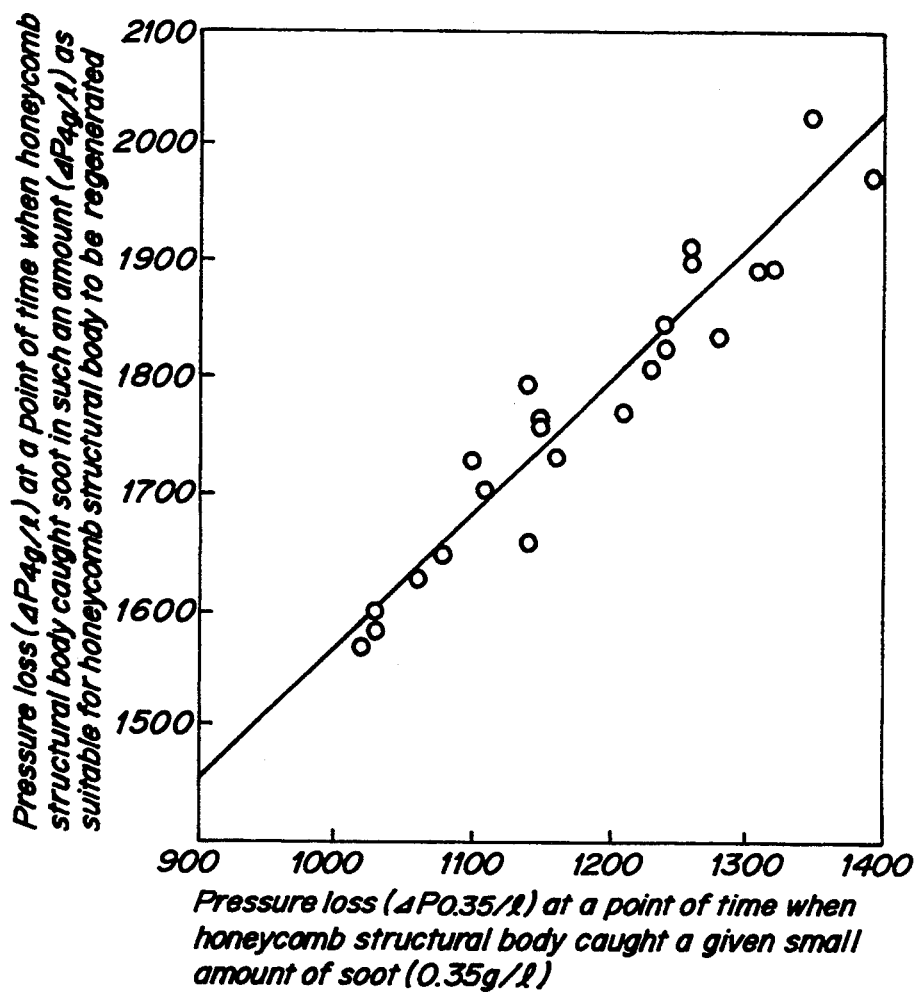
FIG_3

PROCESS AND AN APPARATUS FOR DETERMINING PRESSURE LOSSES OF EXHAUST GAS PURIFICATION HONEYCOMB STRUCTURAL BODIES, BY PRESUMPTION, AT RESPECTIVE POINTS OF TIME WHEN HONEYCOMB STRUCTURAL BODIES ARE TO BE REGENERATED

BACKGROUND OF THE INVENTION

1. Field of the Invention

The present invention relates to a process and an apparatus for determining, through presumption, pressure losses of exhaust gas purification honeycomb structural bodies such as diesel particulate filters (DPF) to be used for the purification of exhaust gases from diesel engines at points of time when the exhaust gas purification honeycomb structural bodies are to be regenerated.

2. Related Art Statement

The above DPF is a honeycomb structural body made of a porous ceramic and having through holes alternatively sealed at opposite end faces, and the honeycomb structural body is assembled into an exhaust line of a diesel engine so that exhaust gases may be fed into the honeycomb structural body from one end face, and flown to the other end face through partition walls between the through holes. Fine particles (particulates) contained in the exhaust gas are filtered off with the partition walls made of the porous ceramic.

In such an exhaust gas purification honeycomb structural body, as the particulates contained in the exhaust gas are heaped on the filter, the pressure loss of the filter becomes extremely great. When the filter heaped with a large amount of the particulates is used as it is, performance of the engine is deteriorated. Accordingly, it is necessary to burn out the particulates heaped on the filter, that is, to regenerate the honeycomb structural body at a point of time when an amount of the heaped particulates reaches a given level. However, since the weight of the particulates heaped on the filter cannot be directly measured after the honeycomb structural body is mounted on the diesel engine or the like, the honeycomb structural body starts to be regenerated at such a timing when the pressure loss of the filter as measured reaches a given level.

However, the pressure loss of the filter generally has a low correlationship to the amount of the particulates heaped on the filter. Even when the pressure loss reaches a given level, an amount of the particulates heaped is actually smaller in some cases than expected, so that no combustion occurs. To the contrary, in the case that an amount of the particulates heaped on the filter is too large at a point of time when the pressure loss reaches a given level, a great amount of heat is generated through the combustion of the heaped particulates, which may crack or melt the filter in other cases.

Therefore, it is necessary to detect the pressure loss at a point of time when the particulates such as soot are caught in an amount for the filter to be suitably regenerated, with respect to the respective filters. However, in order to determine the pressure loss of each honeycomb structural body at a point of time when the regeneration is to be started, it is necessary that a particulate-containing gas is flown through the honeycomb structural body to deposit the particulates thereon, and continuously flown through the honeycomb structural body until the amount of the caught particulates reaches such a level that the honeycomb structural body needs to start to be regenerated, and that the pressure loss is finally measured at a point of time when the amount of the caught particulates reaches such a level. Therefore, the above process unfavorably necessitates a large inspection time.

SUMMARY OF THE INVENTION

The present invention is to solve the abovementioned conventional problems, and to provide a process and an apparatus for accurately determining, by presumption, pressure loss of honeycomb structural bodies, such as DPFs, having a number of through holes alternatively sealed at opposite end faces with accuracy in a short time at a point of time when the particulates are caught by each of the honeycomb structural bodies in such an amount that the honeycomb structural body needs to start to be regenerated.

In order to solve the above problems, the present invention relates to a process for determining pressure loss of exhaust gas purification honeycomb structural bodies to be inspected, said honeycomb structural bodies having a number of through holes alternatively sealed at opposite end faces, comprising the steps of:

(1) flowing particles through each of several test exhaust gas purification honeycomb structure body in an axial direction of the through holes, (2) first determining a relationship between the pressure loss of the test exhaust gas purification honeycomb structural body at a point of time when the test honeycomb structural body catches a given amount of the particles and the pressure loss of the test honeycomb structural body at a point of time when the test honeycomb structural body catches the particles in such an amount suitable for the regeneration, (3) then measuring the pressure loss of a honeycomb structural body to be inspected, at a point of time when the honeycomb structural body to be inspected catches said given amount of the particles, and (4) based on the thus measured pressure loss, presuming the pressure loss at a point of time suitable for the regeneration thereof with reference to the relationship determined above.

An apparatus for determining, by presumption, pressure losses of exhaust gas purification honeycomb structural bodies to be inspected, said honeycomb structural body having a number of through holes alternatively sealed at opposite end faces, said apparatus comprising a support table for gas-tightly supporting a periphery of an end portion of an exhaust gas purification honeycomb structural body having a number of through holes alternatively sealed at opposite end faces, a particle-containing gas generator connected to said support table through a flow path and adapted for generating a particle-containing gas, a flow path-switching valve for opening or closing said flow path relative to said honeycomb structural body by switching, an inspection time-adjusting timer for allowing a given amount of particles to be heaped on said honeycomb structural body by opening and closing the flow path with said flow path-switching valve, and a differential pressure gauge for measuring a pressure difference between an inlet side and an outlet side of said exhaust gas purification honeycomb structural body set on said support table.

As mentioned above, the process of the present invention is based on the phenomenon that when the particulate-containing gas is flown through the honeycomb structural body having a number of through holes alternatively sealed at opposite end faces, the pressure loss of the honeycomb structural body varies substantially linearly relative to the heaped amount during a time period from a point of time when a given amount of particulates are caught by the honeycomb structural body to a point of time when the particulates are caught by the honeycomb structural body in such an amount as being suitable for the regeneration of the honeycomb structural body. That is, the pressure loss of a honeycomb structural body is actually measured at a point of time when the honeycomb structural body catches the particulates in a given amount falling in the substantially linear relationship to the pressure loss, and then the pressure loss of the honeycomb structural body at the time of the regeneration is determined by presumption based on the pressure loss at this point of time with reference to the above-determined relationship. Accordingly, the pressure loss of the honeycomb structural body at a point of time when the honeycomb structural body is to be regenerated can be determined in a short time.

Further, according to the apparatus for determining a pressure loss of exhaust gas purification honeycomb structural bodies having a number of through holes alternatively sealed at opposite end faces, comprises a support table for gas-tightly supporting a periphery of an end portion of an exhaust gas purification honeycomb structural body having a number of through holes alternatively sealed at opposite end faces, a particle-containing gas generator connected to said support table through a flow path and adapted for generating a particle-containing gas, a flow path-switching valve for opening or closing said flow path relative to said honeycomb structural body by switching, an inspection time-adjusting timer for allowing a given amount of particles to be heaped on said honeycomb structural body by opening and closing the flow path with said flow path-switching valve, and a differential pressure gauge for measuring a pressure difference between an inlet side and an outlet side of said exhaust gas purification honeycomb structural body set on said support table. Thus, since a time period during which a given amount of the particulates are heaped on the honeycomb structure is set by the timer, the pressure loss of the honeycomb structural body can be measured by the differential pressure gauge at the thus set time.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 2 is a graph showing an increased state of the pressure loss when soot is flown through a honeycomb structural body at a give rate; and FIG. 3 is a graph showing the relationship between the pressure loss of the honeycomb structural body at the point of time when a given amount of soot is caught by the honeycomb structural body and the pressure loss at the point of time when the honeycomb structural body is to be regenerated.

DETAILED DESCRIPTION OF THE INVENTION

Figure 1:
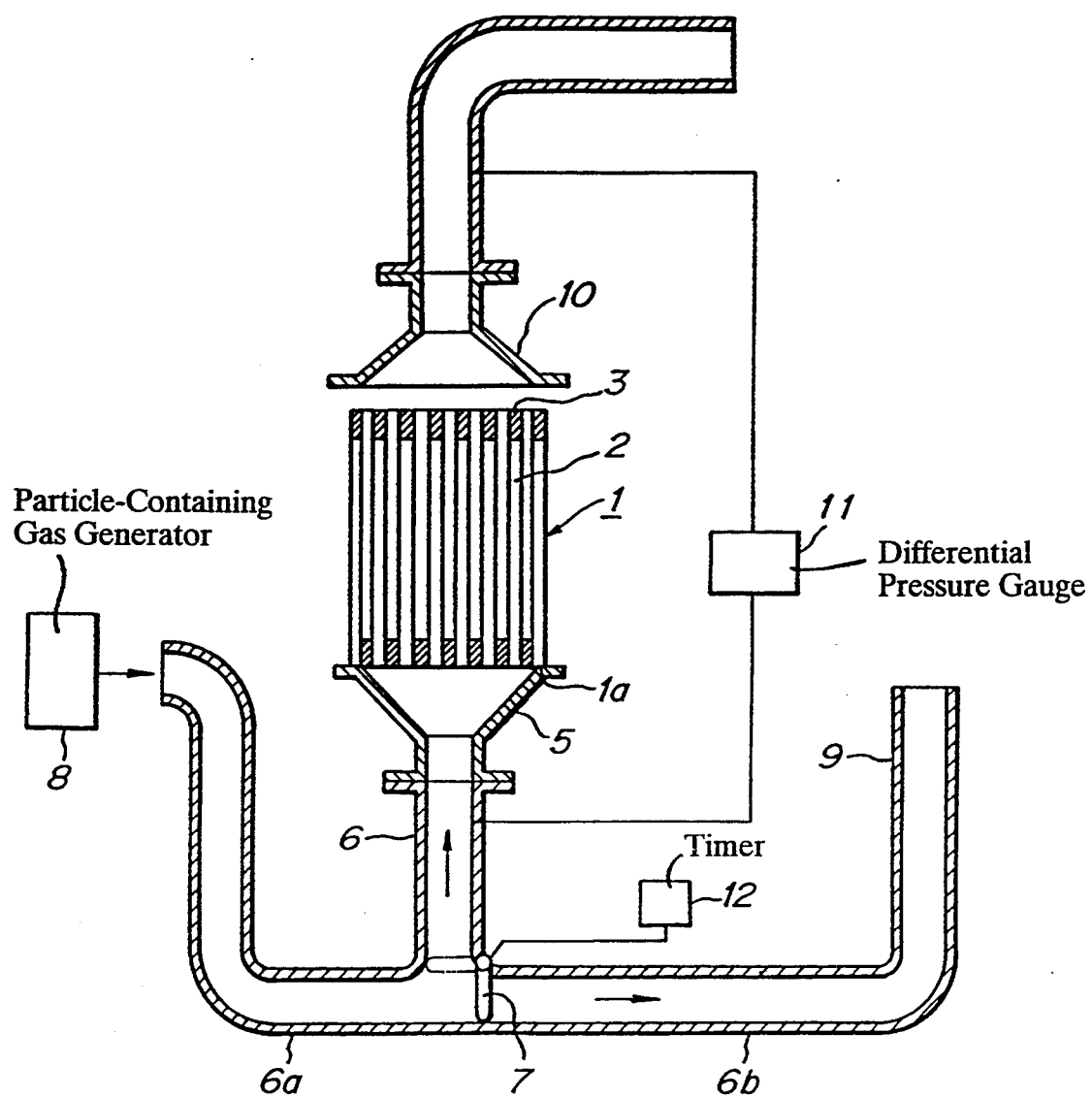
FIG. 1 is a view for illustrating an embodiment of an inspection apparatus according to the present invention.

The inspection process according to the present invention is effected by (1) flowing particles through each of exhaust gas purification honeycomb structural bodies of a given type in an axial direction of the through holes thereof, (2) determining a relationship between the pressure loss of the exhaust gas purification honeycomb structural body at a point of time when the honeycomb structural body catches a given amount of the particles and the pressure loss of the honeycomb structural body at a point of time when the honeycomb structural body catches the particles in such an amount suitable for the regeneration, (3) then measuring the pressure loss of a honeycomb structural body to be inspected, at a point of time when the honeycomb structural body to be inspected catches said given amount of the particles, and (4) based on the thus measured pressure loss, presuming the pressure loss at a point of time suitable for the regeneration thereof with reference to the relationship determined above.

The relationship is first determined as mentioned below between the pressure loss of the exhaust gas purification honeycomb structural body at a point of time when the honeycomb structural body catches a given amount of the particles and the pressure loss of the honeycomb structural body at a point of time when the honeycomb structural body catches the particles in such an amount suitable for the regeneration.

That is, a number of honeycomb structural bodies of the same type having as wide a pressure loss range as possible are prepared. With respect to each of the honeycomb structural bodies thus prepared, a given amount of the particles is caught by the honeycomb structural body, and the pressure loss of the honeycomb structural body is measured at that time. The particles are further continuously caught by the honeycomb structural body until a point of time when the honeycomb structural body catches the particles in such an amount as suitable for the regeneration of the honeycomb structural body, and finally the pressure loss of the honeycomb structural body at the point of time suitable for regeneration is measured. Thereafter, with respect to the honeycomb structural bodies of which the pressure losses are measured, the relationship is determined between the pressure loss of the exhaust gas purification honeycomb structural body at a point of time when the honeycomb structural body catches a given amount of the particles and the pressure loss of the honeycomb structural body at a point of time when the honeycomb structural body catches the particles in such an amount as suitable for the regeneration.

Next, the way of presuming the pressure loss of the honeycomb structural body at a point of time when the honeycomb structural body catches the particles in such an amount as suitable for the regeneration will be explained below.

The pressure loss of an exhaust gas purification honeycomb structural body to be inspected is actually measured at a point of time when the honeycomb structural body catches the above given amount of the particles, and then the pressure loss of this exhaust gas purification honeycomb structural body at a point of time when the honeycomb structural body catches the particles in such an amount of the particles as suitable for the regeneration is calculated or presumed based on the above actually measured pressure loss by using the above relationship.

In FIG. 1 is shown an embodiment of the inspection apparatus according to the present invention for inspecting exhaust gas purification honeycomb structural bodies. As shown in FIG. 1, an exhaust gas purification ceramic honeycomb structural body 1 has a number of through holes 2 sealed with a sealant 3, alternatively at opposite end faces.

A conical hollow support table 5 is to gas-tightly support a peripheral portion 1a of the exhaust gas purification honeycomb structural body 1. A gas-feeding pipe 6 is connected to a lower side of the support table 5. A lower end of the gas-feeding pipe 6 is bifurcated, and a switch valve 7 is arranged at a branched portion. One branched pipe 6a is connected to a particle-containing gas generator 8, and the other branched pipe 6b is connected to an exhaust pipe 9.

In the illustrated embodiment, the particle-containing gas generator 8 is a soot generator utilizing incomplete combustion of a fuel. For example, the generator 8 generates black soot having particle diameters of 0.1 to 1.0 $\mu$m. In the inspector according to the present invention, various particles other than soot may be utilized. For example, particles such as wheat powder may be used.

The switch valve 7 is controlled to be switched as follows: When the honeycomb structural body to be inspected is to be exchanged for the inspection or during an initial operation stage of the soot generator 8, the gas-feeding pipe 6 is closed with the valve 7 to discharge the soot-containing gas toward the exhaust pipe 9. On the other hand, when the honeycomb structural body placed on the support table 5 is to be inspected or when the soot can come to be fed at a given concentration from the soot generator 8 to the honeycomb structural body 1, the switch valve is switched to feed the soot-containing gas to the honeycomb structural body.

By so doing, the soot generator can be continuously operated always under given conditions, so that the soot-containing gas can be always fed at a given concentration to the honeycomb structural body.

Such a switch valve 7 is necessary when a particle generator having an unstable performance at the initial particle-generating stage and in the case of restarting after the rest, particularly, such as the soot generator, is employed.

An exhaust cylinder 10 is closely fitted onto an upper peripheral face of the honeycomb structural body placed on the support table 5, and a differential pressure gauge 11 is provided to measure the pressure loss of the honeycomb structural body 1. A timer 12 is provided to control the switch valve 7 such that a given amount of the soot may be fed into the honeycomb structural body 1.

The process for inspecting the exhaust gas purification honeycomb structural body according to the present invention with the use of the above apparatus will be explained below.

The exhaust gas purification honeycomb structural body 1 to be inspected is set on the support table 5, and the switch valve 7 is switched to flow the gas containing the particles at a given concentration from the soot generator 8 axially through the through holes 2 of the exhaust gas purification honeycomb structural body 1 from the lower face of the honeycomb structural body in such an amount that a given amount of the particles may be deposited in the through holes of the honeycomb structural body. As mentioned above, since the soot generator 8 is unstable at the leading time, the switch valve 7 is switched to close the gas-feeding pipe 6 until the gas containing the soot at a given concentration begins to flow. When the soot begins to be generated at the given concentration, the switch valve 7 is switched to flow the soot-containing gas through the honeycomb structural body 1. The solid particles such as the soot are captured by partition walls of the honeycomb structural body, so that the pressure loss of the exhaust gas purification honeycomb structural body 1 increases. A pressure loss-increasing process is graphically shown in FIG. 2.

As is clear from the graph, the pressure loss-increasing process essentially consists of the following three stages:

First stage

The porous surfaces of the cell walls of the exhaust gas purification honeycomb structural body 1 are covered with the fine particles, and the pressure loss rapidly increases.

Second stage

As the fine particle layer is formed on each of the cell walls, the pressure loss substantially linearly increases following heaping of the fine particles thereupon.

Third stage

When the thickness of the heaped layer becomes greater and the inlet of each cell becomes smaller, the pressure loss rapidly increases.

Among these three stages, a DPF-usable zone in which the DPF may be used without deteriorating the performance of the engine corresponds to the above second stage. In this second stage, since the pressure loss almost linearly increases, the pressure loss at a point of time when such an amount of the particles as suitable for the regeneration of the DPF on a practical use is heaped can be presumed at a high accuracy by the measurement of the pressure loss at an initial stage in the second stage.

In the following, actually performed experiments will be explained.

Various exhaust gas purification honeycomb structural bodies (Sample Nos. 1 through 24) each having a filtering volume of 17 liters were prepared. Each of the honeycomb structural bodies was set on the inspector shown in FIG. 1, and an exhaust gas containing particles at a concentration of 120 g/hr was flown through the honeycomb structural body at a flow rate of 12 Nm$^3$/min. and a temperature of 200° of the exhaust gas. Then, the pressure loss was measured at a point of time when the honeycomb structural body caught a given small amount, that is, 5.9 g(0.35 g/liter), of the soot. This pressure loss at the above point of time corresponds to a pressure loss in the initial period of the second stage shown in FIG. 2. Further, each of the same samples was employed, and the pressure loss was measured at a final point of time in the second stage, i.e., when the honeycomb structural body caught the soot by such a weight [68 g (4 g/liter)] as suitable for the regeneration of the honeycomb structural body. Measured results are shown in Table 1.

TABLE 1

| Sample No. | Pressure loss at a point of time when sample caught a given small amount of soot (mmH₂O) | Pressure loss at a point of time when sample caught soot in such an amount as to be regenerated (mmH₂O) |
| --- | --- | --- |
| 1 | 1020 | 1574 |
| 2 | 1030 | 1590 |
| 3 | 1030 | 1604 |
| 4 | 1060 | 1635 |
| 5 | 1080 | 1652 |
| 6 | 1100 | 1737 |
| 7 | 1110 | 1708 |
| 8 | 1140 | 1668 |
| 9 | 1140 | 1801 |
| 10 | 1150 | 1771 |
| 11 | 1150 | 1773 |
| 12 | 1150 | 1767 |
| 13 | 1160 | 1740 |
| 14 | 1210 | 1780 |
| 15 | 1230 | 1817 |
| 16 | 1240 | 1856 |
| 17 | 1240 | 1853 |
| 18 | 1260 | 1914 |
| 19 | 1260 | 1923 |
| 20 | 1280 | 1844 |
| 21 | 1310 | 1905 |
| 22 | 1320 | 1907 |
| 23 | 1350 | 2036 |
| 24 | 1400 | 1952 |

FIG. 3 graphically shows and summarizes the experimental results given in Table 1. A relational equation (1) was determined, based on the values given in Table 1 and the graph in FIG. 3, between the pressure loss at the point of time when the given small amount of the soot (0.35 g/liter) was caught and the pressure loss at the point of the time when the given weight (4 g/liter) of the soot was caught. According to the above relationship, it was revealed that the relation between these pressure losses varies almost linearly, and a linear coefficient between these pressure loss is 0.95 in this case. This shows that the inspecting process according to the present invention has a high accuracy.

$$\Delta P_{4\ g/liter} = 1.1 \times \Delta P_{0.35g/liter} + 481$$

in which $\Delta P_{4\ g/liter}$ and $\Delta P_{0.35g/liter}$ are the pressure loss at the point of time when the given small amount of the soot (0.35 g/liter) was caught and the pressure loss at the point of the time when the given weight (4 g/liter) of the soot was caught.

It is preferable that the pressure loss of the honeycomb structural body is measured at a point of time when the honeycomb structural body catches the soot by an amount of 1/50 to ½ times as much as the weight (68 g in this case) of the soot suitable for the honeycomb structural body to be regenerated. By so doing, the pressure loss of the honeycomb structural body suitable for the regeneration can be presumed at high accuracy.

As mentioned above, according to the present invention, since the pressure loss at a point of time when the honeycomb structural body is to be regenerated is presumed through the measurement of the pressure loss at the point of time when the honeycomb structural body catches a given small amount of the particles or soot, a pressure loss of each of honeycomb structural bodies at a point of time suitable for the regeneration can be presumed with high accuracy in a short time.

The present invention is not limited to the above-mentioned experiments, and various modifications, variations and changes of the same could be made. In actual inspection, a pressure loss of each of honeycomb structural bodies of a certain type is automatically measured, and the pressure loss of the honeycomb structural body at a point of time suitable for the regeneration is calculated based on thus measured pressure loss according to such a relational equation as mentioned above, and the honeycomb structural bodies are classified into plural classes falling in respectively calculated ranges. Further, it may be that all the honeycomb structural bodies are automatically inspected by an inspecting device assembled above a conveyor.

The material of the filter to which the present invention is applicable is not limited to the ceramics, but the invention is also applicable to heat-resistive materials such as metals. Further, the shape of the filter to which the invention is applicable is not limited to the honeycomb structural body, the invention is also applicable to planar filters and cylindrical filters.

As mentioned above, according to the present invention, the particles are flown through the exhaust gas purification honeycomb structural body from one end face, and the honeycomb structural body is inspected through presumption of the pressure loss, based on change in the pressure loss of the honeycomb structural body, at the point of time when the honeycomb structural body catches the particles in such an amount as suitable for the regeneration. Therefore, the inspecting method and apparatus according to the present invention enable the inspection in a short time, different from the inspection method in which the pressure loss at a point of time suitable for the regeneration is determined by actually capturing the particles onto the honeycomb structural body in such an amount as giving rise to the pressure loss at the point of the time for the regeneration.

What is claimed is:

1. A process for determining a pressure loss of exhaust gas purification honeycomb structural bodies to be inspected, at a point in time when the honeycomb structural body is to be regenerated, said honeycomb structural body having a number of through holes alternatively sealed at opposite end faces, comprising the steps of:

(1) flowing particles through each of several test exhaust gas purification honeycomb structural bodies of a given type in an axial direction of the through holes thereof;

(2) measuring, for each Of the several test exhaust gas purification honeycomb structural bodies, (i) a pressure loss therethrough at a first point in time when the test honeycomb structural body traps a given amount of the particles and (ii) the pressure loss through the test honeycomb structural body at a second point in time when the test honeycomb structural body traps the particles in Such an amount suitable for regeneration;

(3) determining a relationship between the measured pressure losses of the several test exhaust gas purification honeycomb structural bodies at said first point in time and the measured pressure losses of the several test honeycomb structural bodies at said second point in time;

(4) measuring the pressure loss of a honeycomb structural body to be inspected, at a point in time when the honeycomb structural body to be inspected traps said given amount of the particles; and (5) based on the thus measured pressure loss, presuming the pressure loss of said honeycomb structural body to be inspected at a point in time suitable for regeneration thereof with reference to said relationship.

2. The process of claim 1, wherein the pressure loss of said honeycomb structural body is measured at a point in time when an amount of particles trapped by the honeycomb structural body equals 1/50 to ½ of that at the point in time when the honeycomb structural body is to be regenerated.

3. An apparatus for determining, by presumption, pressure loss of exhaust gas purification honeycomb structural bodies having a number of through holes alternatively sealed at opposite end faces, said apparatus comprising:

a support table for gas-tightly supporting a periphery of an end portion of an exhaust gas purification honeycomb structural body having a number of through holes alternatively sealed at opposite end faces;

a particle-containing gas generator connected to said support table through a flow path and adapted for generating a particle-containing gas;

a flow path-switching valve for opening or closing said flow path relative to said honeycomb structural body by switching;

an inspection time-adjusting timer for allowing a given amount of particles to be heaped on said honeycomb structural body by opening and closing the flow path with said flow path-switching valve; and a differential pressure gauge for measuring a pressure difference between an inlet side and an outlet side of said exhaust gas purification honeycomb structural body set on said supporting table.

* * * * *